US007658671B2

(12) United States Patent
Balzo et al.

(10) Patent No.: US 7,658,671 B2
(45) Date of Patent: Feb. 9, 2010

(54) AIR DISTRIBUTION ASSEMBLY FOR VEHICLES

(75) Inventors: Michele Balzo, Turin (IT); Andrea Carbone, Turin (IT)

(73) Assignee: Denso Thermal Systems SpA, Porino (Turin) (IT)

( * ) Notice: Subject to any disclaimer, the term of this patent is extended or adjusted under 35 U.S.C. 154(b) by 351 days.

(21) Appl. No.: 11/669,012

(22) Filed: Jan. 30, 2007

(65) Prior Publication Data
US 2007/0184774 A1 Aug. 9, 2007

(30) Foreign Application Priority Data
Feb. 3, 2006 (EP) .................... 06425058

(51) Int. Cl.
*B60H 1/00* (2006.01)
*B60H 1/34* (2006.01)
*F24F 3/052* (2006.01)
*F16H 1/20* (2006.01)

(52) U.S. Cl. .......................... 454/152; 454/69; 454/121; 454/127; 454/143; 165/204; 137/865

(58) Field of Classification Search .............. 454/69, 454/121, 126, 127, 143, 152; 74/89.18; 165/204; 137/865
See application file for complete search history.

(56) References Cited

U.S. PATENT DOCUMENTS

| 4,232,211 | A | * | 11/1980 | Hill .......................... 219/202 |
| 4,355,752 | A | * | 10/1982 | Antoine ................. 237/12.3 B |
| 4,459,466 | A | * | 7/1984 | Nakagawa et al. .......... 392/307 |
| 4,616,164 | A | * | 10/1986 | Kenny et al. ................. 318/666 |
| 4,749,004 | A | * | 6/1988 | Peash ......................... 137/865 |
| 5,279,459 | A | * | 1/1994 | Single, II .................... 237/2 A |
| 5,647,399 | A | * | 7/1997 | Andersen ................. 137/637.3 |
| 5,797,585 | A | * | 8/1998 | Auvity ........................ 251/80 |
| 5,860,321 | A | * | 1/1999 | Williams et al. ............. 74/143 |
| 5,901,943 | A | * | 5/1999 | Tsunoda ..................... 251/294 |
| 6,209,404 | B1 | * | 4/2001 | Le .......................... 74/89.18 |
| 6,254,474 | B1 | * | 7/2001 | Davidsson .................. 454/69 |
| 6,354,935 | B1 | * | 3/2002 | Kurokawa et al. .......... 454/156 |
| 6,398,638 | B1 | * | 6/2002 | Shibata et al. ................ 454/69 |

(Continued)

FOREIGN PATENT DOCUMENTS

DE    201 06 789    10/2001

(Continued)

OTHER PUBLICATIONS

EP Search Report, Application No. EP 06 42 5058, dated Jul. 3, 2006.

*Primary Examiner*—Steven B McAllister
*Assistant Examiner*—Patrick F O'Reilly
(74) *Attorney, Agent, or Firm*—Patterson & Sheridan, L.L.P.

(57) ABSTRACT

An air distribution assembly for vehicles, comprising a first flap, able to rotate around a first axis, a second distribution flap, able to rotate around a second axis, and a geared transmission device that connects the first and the second flap to each other. The transmission device comprises at least one gear wheel including a first and a second element able to rotate relative to each other and an elastic element positioned between the first and the second element to allow a relative rotation motion between the first and the second element.

5 Claims, 3 Drawing Sheets

U.S. PATENT DOCUMENTS

| | | | |
|---|---|---|---|
| 6,431,266 B1 * | 8/2002 | Han | 165/204 |
| 6,761,214 B2 * | 7/2004 | Kuribayashi et al. | 165/204 |
| 6,855,050 B2 * | 2/2005 | Gagnon et al. | 454/369 |
| 2002/0007642 A1 | 1/2002 | Reinisch et al. | |

FOREIGN PATENT DOCUMENTS

| | | |
|---|---|---|
| EP | 1 044 832 | 10/2000 |
| EP | 1486361 A1 * | 12/2004 |

* cited by examiner

AIR DISTRIBUTION ASSEMBLY FOR VEHICLES

CROSS-REFERENCE TO RELATED APPLICATIONS

This application claims benefit of European patent application number 06425058.2, filed Feb. 3, 2006, which is herein incorporated by reference.

BACKGROUND OF THE INVENTION

Description of the Related Art

In air distribution assemblies for vehicles, the need often arises to provide two air distribution flaps, rotatable around two distinct axes and provided with a different maximum angular travel. In particular, there is a need to obtain a solution in which one of the two flaps can continue to move even when the other flap has already reached an end stop position.

SUMMARY OF THE INVENTION

The present invention relates to an air distribution assembly for vehicles, comprising:
 a first distribution flap, rotatable around a first axis,
 a second distribution flap, rotatable around a second axis, and
 a geared transmission device that connects the first and the second flap to each other.

The object of the present invention is to provide an air distribution assembly for vehicles which is able to meet the aforesaid requirement with a simple, reliable and resistant solution.

According to the present invention, said object is achieved by an air distribution assembly having the characteristics set out in claim 1.

BRIEF DESCRIPTION OF THE DRAWINGS

The characteristics and the advantages of present invention shall become readily apparent in the detailed description that follows, provided purely by way of non-limiting example, in which.

DETAILED DESCRIPTION

Figure 1:
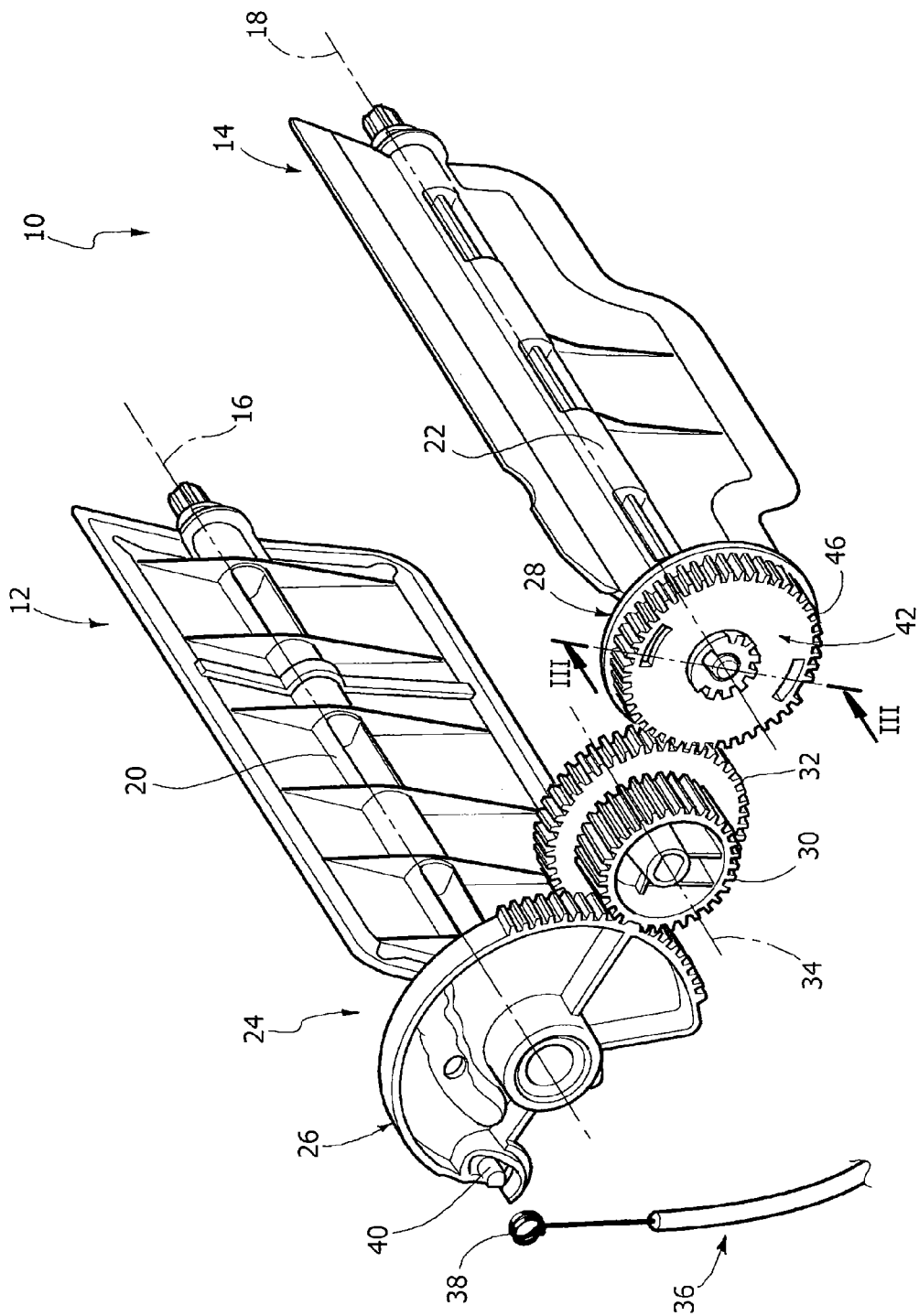
FIG. 1 is a schematic perspective view of an air distribution assembly according to the present invention.

With reference to FIG. 1, the number 10 designates an air distribution assembly for vehicles comprising a first distribution flap 12 and a second distribution flap 14. The distribution flaps 12, 14 are pivotally supported by a housing (not shown) around the respective axes 16, 18. In the embodiment illustrated in the figures, the two axes of rotation 16, 18 are parallel to each other.

In the embodiment shown in the figures, the distribution flaps 12, 14 are of the "butterfly" type, i.e. with the respective axes of rotation 16, 18 contained in the general plane of the flaps 12, 14. The distribution flaps 12, 14 have respective shafts 20, 22 preferably integral with the bodies of the flaps 12, 14 and defining the axes of rotation 16, 18.

The distribution assembly 10 comprises a geared transmission device 24 which connects the first flap 12 and the second flap 14 to each other. The geared transmission assembly 24 comprises a first gear wheel 26 fastened on the shaft 20 of the first flap 12, and a second gear wheel 28 fastened on the shaft 22 of the second flap 14. In the example shown in the figures, the two gear wheels 26, 28 respectively mesh with a third and a fourth gear wheel 30, 32 with a different number of teeth, integral with each other and rotatable around an axis 34, parallel to the axes of rotation 16, 18 of the flaps 12, 14.

The gear wheels of the transmission device 24 can have teeth on their entire periphery, as in the case of the gear wheels 28, 30, 32, or they can have only a toothed sector, as in the case of the gear wheel 26.

The transmission device 24 is associated to a control device which enables the setting of the angular position of the distribution flaps 12, 14. In the illustrated example, the control device comprises a Bowden cable 36 having one end 38 anchored to a stake 40 of the first gear wheel 26.

Figure 2:
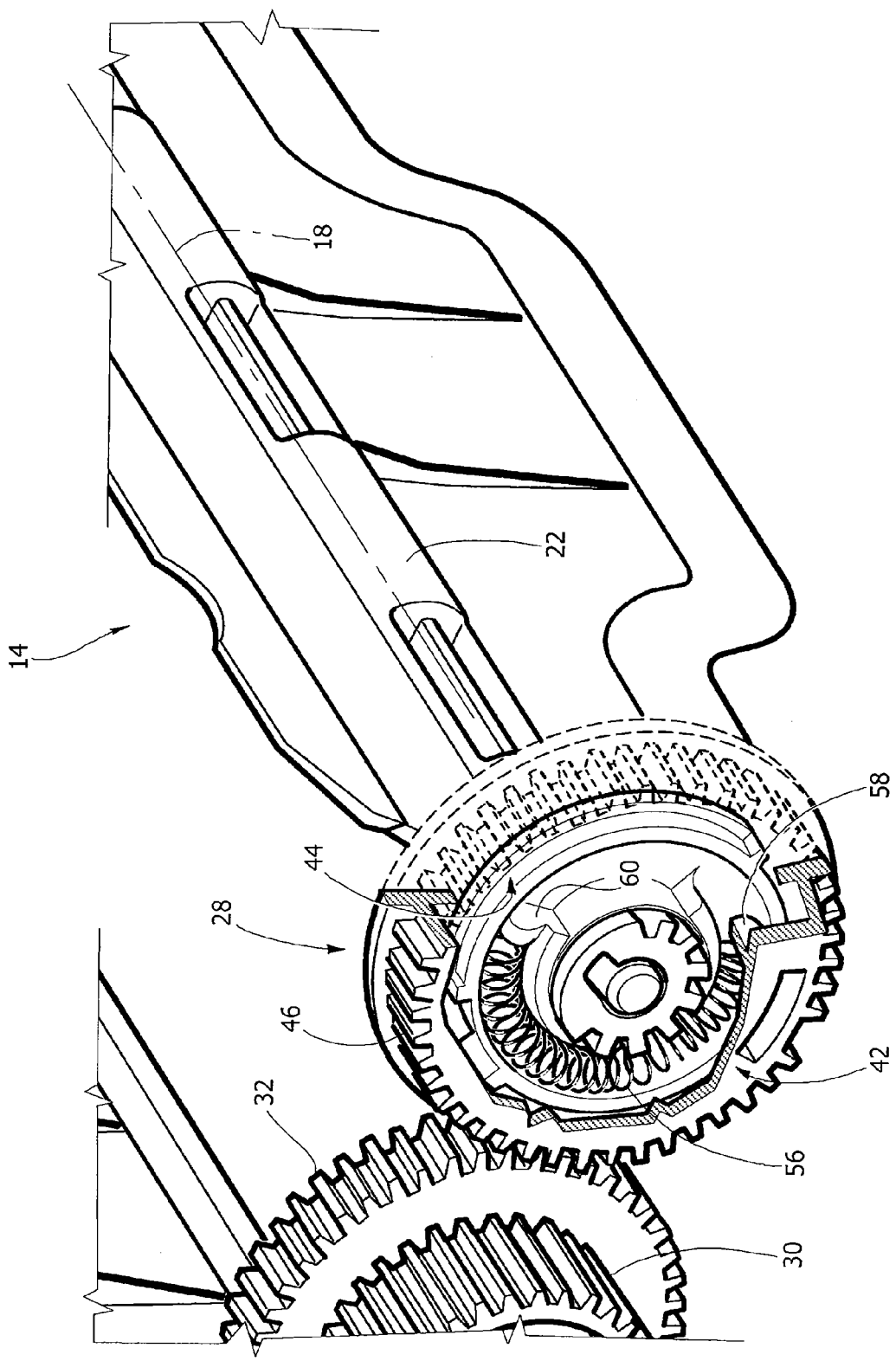
FIG. 2 is a perspective view in enlarged scale and partially sectioned of a part of the transmission device in FIG. 1.
Figure 3:
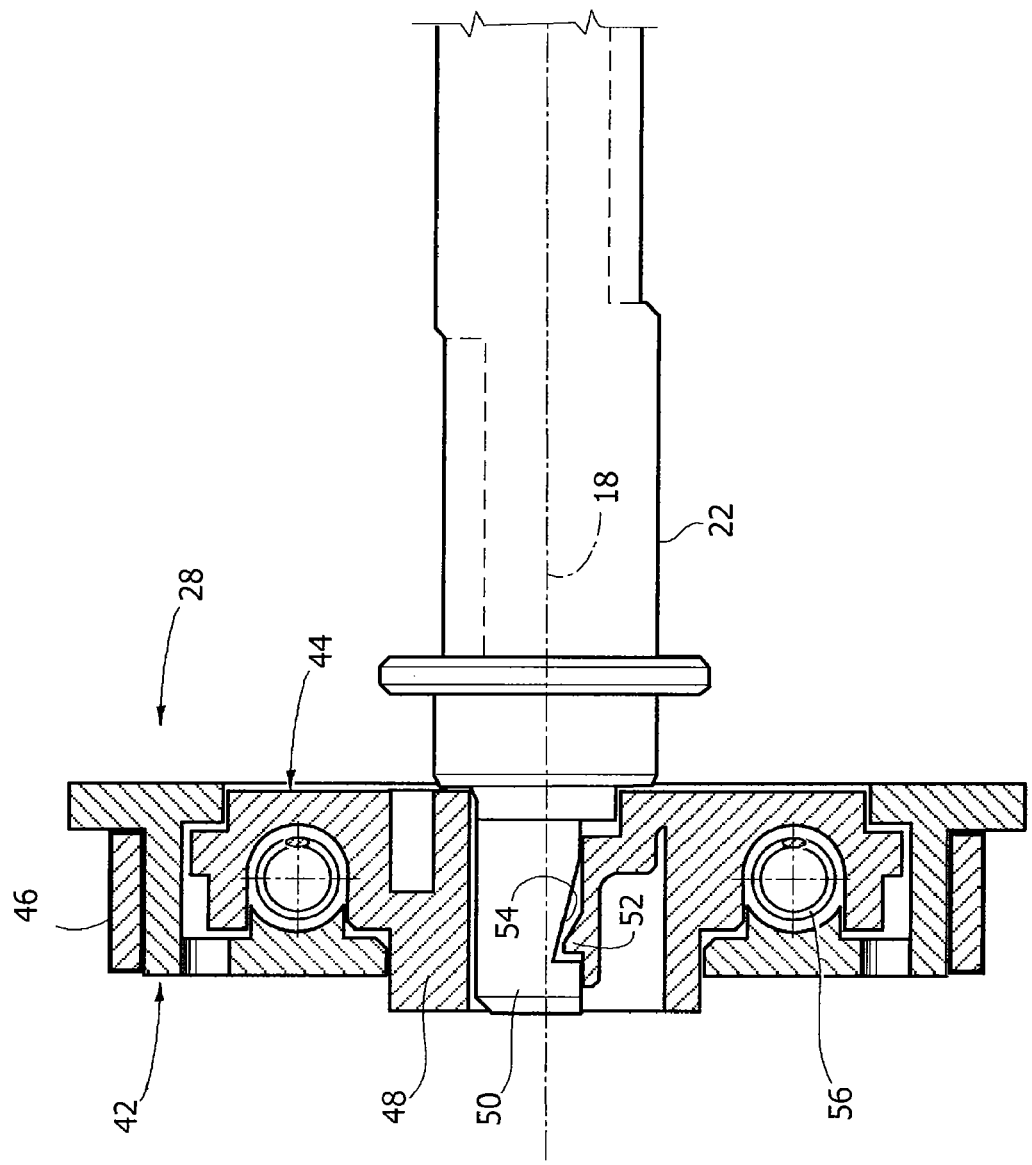
FIG. 3 is a section according to the line III-III of FIG. 1.

With reference to FIGS. 2 and 3, the second gear wheel 28 comprises a first element 42 and a second element 44, able to rotate relative to each other with respect to the axis of rotation 18 of the second distribution flap 14. The first element 42 is provided on its outer surface with a set of teeth 46 whilst the second element 44 is provided with a hub 48 whereto is coupled an end 50 of the shaft 22. Preferably, the hub 48 of the second element 44 is provided with an elastically deformable tooth 52 which is engaged in snap-in fashion in a seat 54 formed on the end 50 of the shaft 22.

Between the two elements 42, 44 of the second gear wheel 28 is provided an elastic element 56. The elastic element has a first end which bears against the first element 42 and a second end which bears against the second element 44. In the example shown in the figures, the elastic element under compression 56 is formed by a helical spring housed in an annular seat concentric relative to the axis of rotation 18. A first end of the spring 56 bears on a projection 58 of the first element 42 and a second end of the spring 56 bears on a projection 60 of the second element 44.

The elastic element tends to thrust the two elements 42, 44 towards a position in which the two elements are in mutual abutment contact. In operation, the position of the first distribution flap 12 is set using the control device 36. The angular motion of the first gear wheel 26 is transmitted to the second gear wheel 28 through the two intermediate wheels 30, 32. When the second distribution flap 14 is in an intermediate position between the end stop positions, the rotational motion is transmitted from the first element 42 to the second element 44 of the second gear wheel 28 by means of the elastic element 56, without any variation in angular position between the first and second element 42, 44.

When the second distribution flap 14 reaches an end stop position, the first distribution flap 12 can continue to rotate. This further rotation of the first distribution flap 12 produces a rotation of the first element 42 of the gear wheel 28, whilst the second element 44, integral with the second distribution flap 14, remains motionless. The relative rotation motion between the elements 42, 44 of the second gear wheel 28 produces a compression of the elastic element 56.

It will thus be readily apparent that the present invention enables the rendering of the movements between the two distribution flaps 12, 14 mutually independent since the first distribution flap 12 can perform additional movements even after the second distribution flap 14 has reached an end stop position.

The solution according to the present invention enables the obtaining of greater reliability and resistency with respect to other possible solutions that allow the rendering of the movements of the distribution flaps 12, 14 mutually independent.

The solution according to the invention is easy to standardise and applicable to distribution assemblies of different kinds, and it can be used in all cases in which there is a need to enable the actuation of some elements of the kinematic chain when others are already abutting.

The invention claimed is:

1. An air distribution assembly for vehicles, comprising:
a first flap, rotatably mounted around a first axis,
a second flap, rotatably mounted around a second axis, and
a geared transmission device that connects the first and the second flap to each other, wherein the said transmission device comprises at least one gear wheel including a first and a second element able to rotate relative to each other and an elastic element positioned between the first and the second element to allow a relative rotation motion between the first and the second element, wherein the first element of the gear wheel is provided with a set of teeth and in that the second element of the gear wheel is provided with a hub for fastening the gear wheel on a shaft of one of said flaps and wherein the hub of the second element of the gear wheel is provided with an elastically deformable tooth which engages in snap-on fashion a seat of an end of a shaft of the second flap.

2. The air distribution assembly as claimed in claim 1, wherein the elastic element has a first end abutting against a projection of the first element and a second end abutting against a projection of the second element.

3. The air distribution assembly as claimed in claim 2, wherein the elastic element is housed in an annular seat concentric with respect to the axis of rotation of the gear wheel.

4. An air distribution assembly for vehicles, comprising:
a first flap, able to rotate around a first axis;
a second flap, able to rotate around a second axis; and
a geared transmission device that connects the first and the second flap to each other, wherein the transmission device comprises at least one gear wheel including a first and a second element able to rotate relative to each other, the first element of the gear wheel being provided with a set of teeth and the second element of the gear wheel being provided with a hub for fastening the gear wheel on a shaft of one of the flaps and wherein an helical compression spring is housed in an annular seat positioned between the first and the second element and concentric with respect to the axis of rotation of the gear wheel, the spring having a first end abutting against a projection of the first element and a second end abutting against a projection of the second element to allow a relative rotation motion between the first and the second element.

5. The air distribution assembly as claimed in claim 4, wherein the hub of the second element of the gear wheel is provided with an elastically deformable tooth able to engage in snap-on fashion a seat of an end of a shaft of the second flap.

* * * * *